United States Patent
Frehe

[15] 3,665,541
[45] May 30, 1972

[54] MOTOR-DRIVEN SWEEPING MACHINE

[72] Inventor: Dieter Frehe, Macon, France

[73] Assignees: Walter Gutbrod; Wolfgang Gutbrod, Bubingerhof, Bubingen, Saar, Germany

[22] Filed: June 12, 1970

[21] Appl. No.: 45,707

[30] Foreign Application Priority Data

Jan. 12, 1970 Germany ............... P 20 01 046.2

[52] U.S. Cl. ............................................. 15/83, 74/701
[51] Int. Cl. .................................. E10h 1/02, F16h 37/08
[58] Field of Search ............................................. 74/701

[56] References Cited

UNITED STATES PATENTS 2,712,857 7/1955 Jackson .......................... 74/701 X
3,292,758 12/1966 Polak .............................. 192/113
1,630,210 5/1927 Olson .............................. 74/701
3,350,960 11/1969 Lamburn et al. ................ 74/701

Primary Examiner—Arthur I. McKeon
Attorney—William Anthony Drucker

[57] ABSTRACT

A motor-driven floor sweeping machine which has a sweeping mechanism having a shaft driving a change-speed gearing for a travel mechanism, the shaft extending axially relative to drive wheels and carrying a multiple-disc clutch.

4 Claims, 2 Drawing Figures

3,665,541

MOTOR-DRIVEN SWEEPING MACHINE

BACKGROUND OF THE INVENTION

The present invention relates to motor-driven sweeping machines for cleaning various kinds of floor and surface qualities in hangars, halls, workshops or factories, department stores and the like. Such machines must above all possess adequate and adaptable speeds of rotation of the sweeping elements, they must be durable and robust when used in rough working and must be easily operable.

The motorized sweeping machines to be found on the market conform only very incompletely with these requirements. The effectiveness of a sweeping machine depends in fact not only upon the types of broom used, upon the direction of rotation and the speed of rotation thereof, but also upon easy operability and the effectiveness of the control means of the vehicle, that is to say upon the measure of technical perfection of the transmission elements for the torque from the motor to the sweeping elements and to the drive wheels.

The speed of travel of a sweeping machine in forward travel must be variable. Moreover the possibility must be provided of shifting readily to reverse. Both in the technical respect and for the driver, all these operations should be practicable with minimum expenditure.

The known appliances possess frequently quite incomplete technical means and are not capable of ensuring satisfactory work. By way of example, dog clutches are frequently used which as is known possess great imperfections: The impossibility of effecting the coupling operation gradually, their poor adaptability to the working conditions, the danger of fracture and the noisy engagement of the clutch dogs.

Belt pulley clutches have also already been used, the belt pulleys of which have to be repeatedly re-aligned, that is to say readjusted, the flat belts of which easily jump off the pulleys and have only a short life, so that after a short time of use they have to be replaced. The known V-belt clutches possess similar disadvantages.

Finally the use of the conventional, hitherto usual gear box with toothed wheel transmissions is also not the optimum solution. Even when equipped with a plate clutch, it unfortunately does not avoid the disadvantages felt to be burdensome for the driver, which derive mainly from the bulky style of construction of such a clutch and from its sudden and poorly flexible engagement.

SUMMARY OF THE INVENTION

It is desirable in a sweeping machine of the initially mentioned kind, to be able to actuate the movement transmission system from the motor to the traction wheels by means of a simple clutch. This clutch must work quickly, effectively and progressively and must permit both of changing the speed of forward travel and of shifting over to reverse, without difficulty for the driver.

According to the present invention the drive shaft of the sweeping mechanism drives a change-speed gear for the travel mechanism which is arranged in the axial direction of the drive wheels and equipped with a multiple-disc clutch running in an oil bath. The torque is transmitted through a work gearing to the gear wheels which can be brought into engagement for example by means of a centrifugal clutch. These gear wheels through a hollow shaft drive the broom drive systems, both for a cylindrical horizontal sweeping cylinder and for a gutter broom with approximately vertical axis.

The hollow shaft further passes through the oil bath of a gear box and carries a toothed wheel which through a secondary shaft drives a shiftable gearing for two forward gears and one reverse gear.

A double disc-type clutch, running in the oil bath and operable with a lever, permits of shifting the wheel drive system into the desired gear directly or indirectly with interposition of the secondary shaft.

The incorporation of such a clutch system in a motorized sweeping machine permits the driver to carry out the sweeping work with the optimum of sweeping speed in the first or second forward gear, while at any time he can select reverse gear by simple shifting over of a clutch lever. By virtue of the selected number and speed of rotation of the clutch discs it is also not necessary continually to change the working speed by stages. These advantages become especially valuable because the invention renders possible an extremely favorable compact style of construction, which is very significant especially in the case of handle-guided machines.

The invention is explained in greater detail by reference to an example of embodiment in the accompanying drawings which show a preferred form of embodiment in which further features of the invention are discussed, but it is emphasized that it is only a matter of an example of embodiment and other designs are also conceivable within the scope of the invention.

DESCRIPTION OF THE PREFERRED EMBODIMENT

Figure 1:
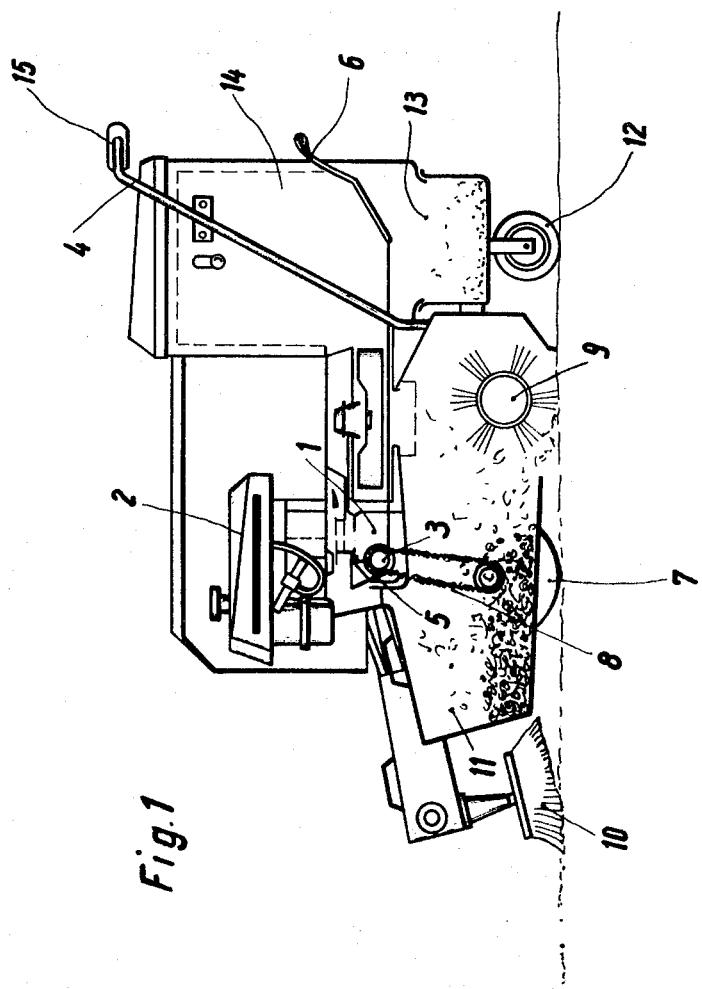
FIG. 1 is a partially sectional lateral elevation of a self-propelled sweeping machine according to the invention.

In a housing 1 according to FIG. 1, the drive shaft 3 of the wheels is accommodated beneath the internal combustion engine 2. The drive elements (not visible) for the horizontal sweeping cylinder 9 and the vertical front broom 10 also lie in this housing 1. The drive of the road wheels 7, only one of which is visible, takes place in known manner through a chain drive system 8. The control movements for the operation of a clutch, which is described further below, are carried out on the handle 15 which is connected with the guide shaft 4. The cable 5 and the hand lever 6 serve for the shifting of the two forward gears. Otherwise the construction of the machine is known and therefore does not need to be described in greater detail. The dirt box is designated by 11, 12 is the single rear wheel, 13 the dust box which is arranged beneath the filter 14.

Figure 2:
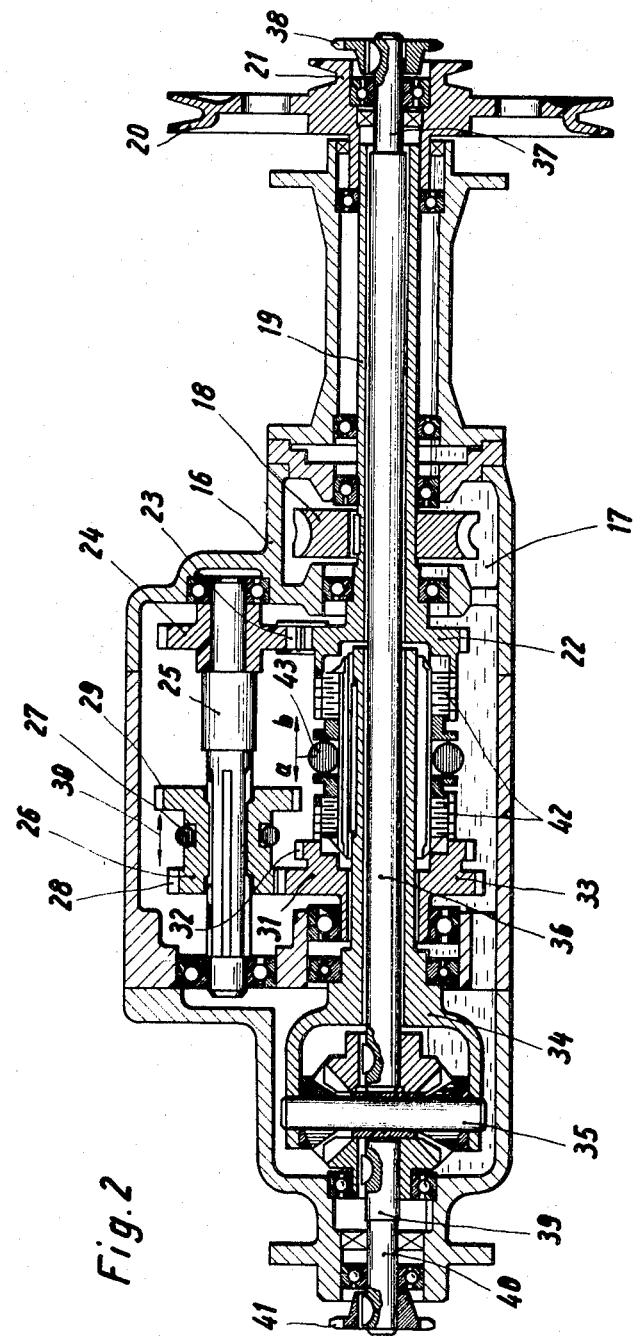
FIG. 2 shows the plan view of the main control mechanism of the drive wheels and brooms on a larger scale and in section.

In FIG. 2 the drive systems for the road wheels and the brooms and their operation are illustrated on a larger scale.

In the housing 16 with oil filling 17 there is the work wheel 18, which is driven by means of a worm (not shown). The worm wheel 18 drives the hollow half shaft 19 which carries the grooved pulleys 20 and 21, firmly connected with the shaft, for the drive of the brooms 9 and 10 (FIG. 1). Towards the other side the hollow shaft 19 passes through an intermediate wall of the housing 16 and terminates in a gear wheel 22 which meshes with a small reversing pinion 23. This again meshes with a further gear wheel 24 which is non-rotatable on the splined shaft 25. On this shaft 25 a set 26 of two gear wheels 28 and 29 of different sizes is movable back and forth in the direction of the arrow 30 by means of the shift fork 27. The sizes of the sliding gear wheels 28 and 29 are calculated according to the desired speeds in the two forward gears. The sliding shaft as described is actuated with the hand lever 6 (FIG. 1). According to choice the sliding wheels can be brought into engagement with the toothed wheels 31 or 32 for the forward drive of the road wheels. These toothed wheels are assembled into a wheel set 33 and connected with the hollow shaft 34 which carries the differential 35 towards its outer end. The latter drives the shaft 36 which through the stub axle 37 drives the chain wheel 38. The chain 8 of a drive wheel 7 (FIG. 1) is guided over this chain wheel. A similarly acting arrangement is provided on the other side of the differential: The shaft 39 terminates in a stub axle 40 which carries the chain wheel 41 for the second road wheel.

The clutch block 42 consists of two packs of discs running in an oil bath 17 and is displaceably mounted on the hollow shaft 34. The displacement takes place by means of a fork 43 which can be operated with the handle 15 secured on the guide shaft 4 according to FIG. 1.

The clutch block 42 can assume three different positions:

1. Shifted in the direction of the arrow a) it connects the wheel assembly 33, that is to say the gear wheels 31 and 32, with the hollow shaft 34; The forward gears are engaged and the speed previously set with the sliding shift fork 27 is transmitted to the road wheels according to one of the gear wheels 28 and 29 for forward travel.
2. In the middle position as illustrated the coupling described under 1) for forward travel is eliminated and the clutch block rotates idly without transmitting the torque, in which case admittedly when the vehicle is stationary the broom drives 19, 20 and 21 still run as before.
3. Shifted in the direction of the arrow b), the clutch connects the hollow shaft 19 of the toothed wheel 22 mounted thereon with the hollow shaft 34. The drive of the road wheels in this clutch position is the converse of that in the clutch position 1.

The reverse gear is engaged and the gear wheels 28, 29 for the two forward gears rotate idly.

I claim:

1. In a motor-driven sweeping machine comprising a housing, road wheels supporting the housing, a dirt box supported on the housing, a first brush supported by the housing and rotatable about a substantially vertical axis, a second brush supported by the housing and rotatable about a horizontal axis, and a prime mover; the provision of a drive shaft driven by the prime mover, drive wheels fixed relative to the drive shaft, transmission means between the drive wheels and the brushes, a gearwheel fixed relative to the drive shaft, a driven shaft, transmission means between the driven shaft and the road wheels, and a clutch running in an oil bath, wherein the clutch is operable to connect the gearwheel through gears to the driven shaft to drive the road wheels in a forward direction and is further operable to connect the gearwheel to the driven shaft to drive the road wheels in reverse, while the drive shaft always drives said brushes in the same direction.

2. A sweeping machine according to claim 1, in which the clutch is a multiple-disc clutch comprising two packs of discs mounted on one common carrier.

3. A sweeping machine according to claim 1, in which the clutch is operable to connect the gearwheel through either one of two forward gears to the driven shaft.

4. A sweeping machine according to claim 1, in which the drive shaft is hollow and the driven shaft extends through the drive shaft.

* * * * *